United States Patent [19]
Skogman

[11] Patent Number: 5,522,340
[45] Date of Patent: Jun. 4, 1996

[54] VESSELS HAVING A DOUBLE-WALLED LAMINATED FRAME

[76] Inventor: Darrel Skogman, 119 Placid Heights, Seguin, Tex. 78155

[21] Appl. No.: 370,671

[22] Filed: Jan. 10, 1995

[51] Int. Cl.⁶ ........................................ B63B 5/24
[52] U.S. Cl. .................. 114/357; 220/415; 220/453; 220/586; 220/587
[58] Field of Search ............. 114/357; 220/415, 220/452, 453, 586, 587; 428/36.1, 36.2

[56] References Cited

U.S. PATENT DOCUMENTS

| | | | |
|---|---|---|---|
| 2,885,303 | 5/1959 | Kaplan | 117/37 |
| 3,061,492 | 10/1962 | Singleton et al. | 114/357 |
| 3,394,841 | 7/1968 | Anderson | 220/453 |
| 3,707,434 | 12/1972 | Stayner | 161/161 |
| 3,775,241 | 11/1973 | Winters | 114/357 |
| 4,090,002 | 5/1978 | Rosenblum | 428/36 |
| 4,818,583 | 4/1989 | Geel | 428/195 |
| 5,034,256 | 7/1991 | Santiso, III et al. | 428/73 |
| 5,116,689 | 5/1992 | Castro et al. | 428/593 |
| 5,141,812 | 8/1992 | Marx et al. | 428/377 |
| 5,188,879 | 2/1993 | Hill et al. | 428/117 |

*Primary Examiner*—Sherman Basinger
*Attorney, Agent, or Firm*—Gunn, Lee & Miller

[57] ABSTRACT

A vessel having a first set of side walls extending from an integral end member with both side walls and end member having a first inner wall spaced apart from a second outer wall and composed of resinous material; and an intermediate single woven member disposed and bonded between the first inner and second outer walls. Examples of such vessels are boat hulls and boat bulkheads. An alternative embodiment vessel is constructed by bonding together two of the first vessels on an edge of the side walls to form a tank for containing fluids. Methods of making these vessels are also disclosed.

8 Claims, 6 Drawing Sheets

VESSELS HAVING A DOUBLE-WALLED LAMINATED FRAME

BACKGROUND OF THE INVENTION

1. Field of the Invention

Applicant's invention relates to the field of construction of double-walled vessels made of woven fiber-reinforced laminated materials; including boat hulls, boat bulkheads, and containers or tanks for holding liquids.

2. Background Information

Presently vessels requiring the use of strong walled materials are made from a number of different molded fiber-reinforced laminated walled structures. One type of vessel, such as a boat hull, is generally composed of a solid thick wall having a thickness of approximately ¾ inch providing a structure with excellent strength characteristics; however, this thick walled vessel is heavy and expensive to make particularly when it is made of solid fiber-reinforced materials. Lighter weight double-walled vessels, having an intermediate space between the walls filled only with polyethylene netting, have been used as underground fluid containing tanks; however, the strength of this vessel is greatly reduced from that of the solid walled structure because the separate walls are not effectively joined for combined strength.

Other double-walled fiberglass vessels have been constructed having an intermediate layer of balsam wood between the separated walls. Such double-walled, balsam filled vessels are expensive, difficult to mold to contours, tend to absorb water, and have limited strength characteristics as compared to the previously discussed solid double-walled structure. Additionally, some vessels for marine use have also used a core material of rigid polyurethane foam with polyester fiberglass outer skins between the two walls; however, expensive molds are required to produce such a core and the core generally has a very low core shear strength.

The present invention provides a strong double-walled vessel by bonding an intermediate single woven member containing a plurality of parallel longitudinally extending cylindrical members and a plurality of parallel fibers woven about the cylindrical members and extending perpendicularly to the cylindrical members between the first inner and the second outer walls. The cylindrical members are retained in the woven member. This configuration provides a vessel with a double-walled laminated frame equivalent in strength to the solid double-walled structures but it contains 50% less raw materials and therefore is less expensive to construct.

The double-walled laminated frames of the vessels of the present invention may contain cylindrical members, which may be hollow, plastic tubes; or solid, foam pipes depending upon the final intended use of the vessel. Further, the vessel of the present invention is prepared on a mold by spraying up one of the walls on the mold, followed by laying the already prepared intermediate single woven member and then spraying up the other wall on the mold.

The double-walled, fiber-reinforced laminated vessels of the present invention provide advantages over the prior art double-walled, laminated vessels because they have equivalent strength to a solid walled vessel and are lightweight yet cost less than prior art vessels as a result of using 50% less raw material. The vessels of the present invention may be used for numerous purposes in the marine industry and in the container or tank industry. The use of double-walled vessels of the present invention in these industries is important because should either the interior wall or exterior wall of the vessel of the present invention fail or be punctured, then the other wall serves as a backup to retain the fluid in the vessel. This is particularly important when such vessels are boat hulls or underground storage tanks retaining gasoline, oil, or other potentially toxic fluids. The double-walled vessels also allow the integrity of the walls to be monitored when the vessel serves as an underground storage tank.

SUMMARY OF THE INVENTION

The present invention provides a vessel having a double-walled, laminated frame, having an intermediate single woven member between the two separated or spaced walls.

The present invention more specifically provides a vessel having a first set of side walls extending from an end member, wherein the side walls and end member are double-walled with an intermediate single woven member bonded between the two, spaced walls.

The present invention additionally provides a strong, lightweight, double-walled, fiberglass, reinforced vessel which can be used in the marine industry and the container industry.

The present invention further provides a tank where two vessel halves are bonded together to form the tank with each vessel half having a set of side walls extending from an end member, wherein the side walls and end member are double-walled with an intermediate single woven member disposed between the two walls of the double wall.

The present invention further provides methods of making the vessels of the present invention.

DETAILED DESCRIPTION OF THE PREFERRED EMBODIMENT

Figure 1A:
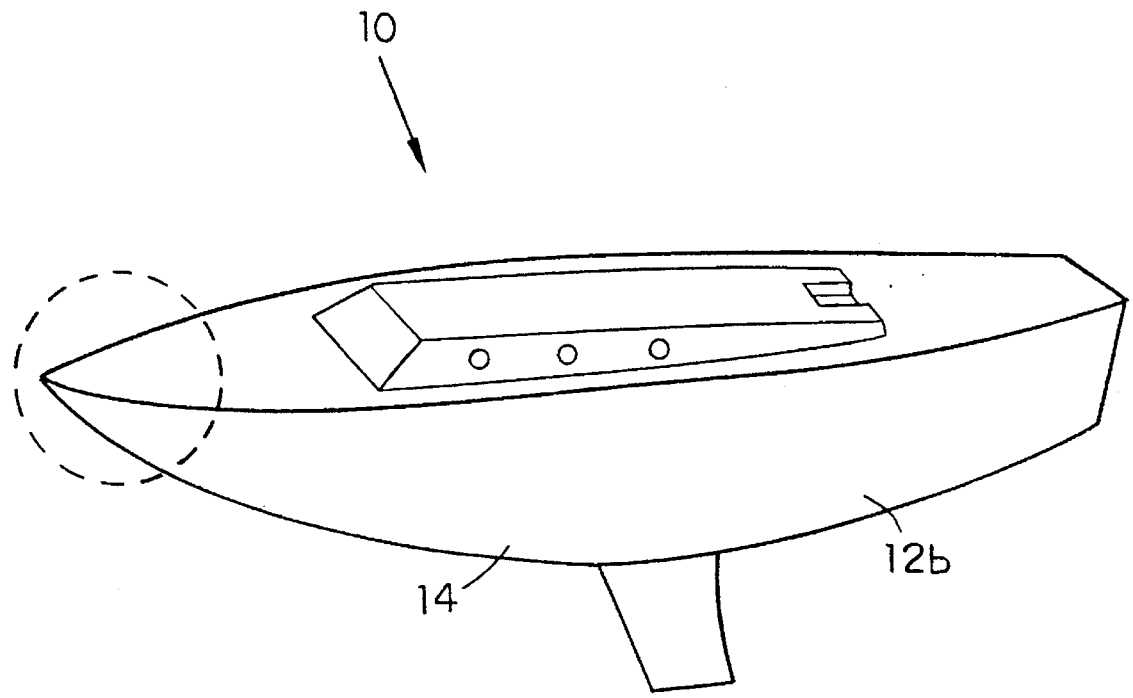
FIG. 1*a* is a perspective view of a vessel of the present invention in the form of a boat hull.

Referring now to FIGS. 1–6, the present invention will be described in detail. The vessel (10) shown in FIG. 1a has a first set of side walls (12a) and (12b) which extend upwardly from an end member or section (14) to form a U-shaped container or receptacle. Each of the side walls (12a) and (12b) and the end member (14) are composed of a double-walled laminate (30) shown in cross section in FIG. 1b and in further detail in FIG. 3.

Figure 2:
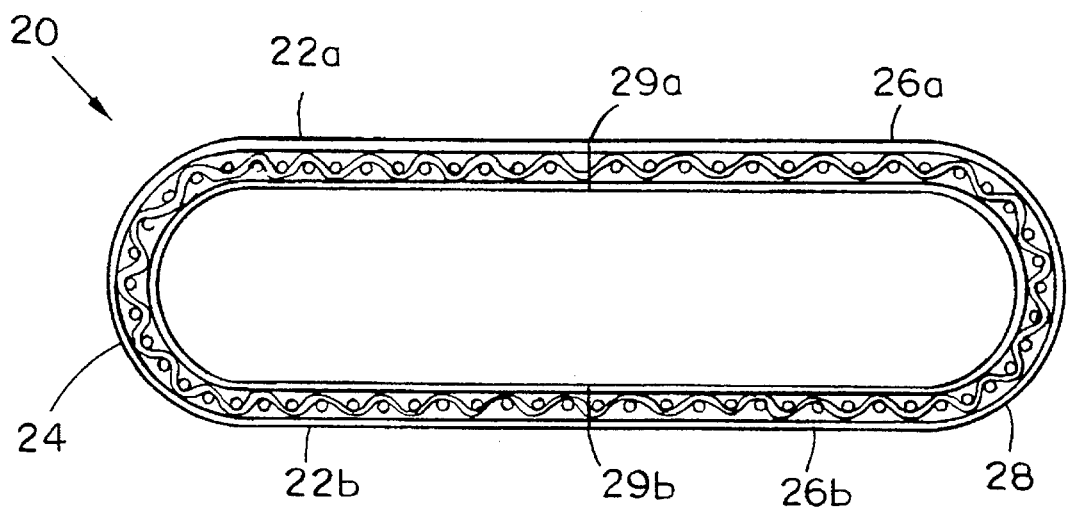
FIG. 2 is a cross-sectional view of an alternative vessel of the present invention formed by bonding two vessel halves to form a tank.

FIG. 2 shows in cross-section a generally cylindrical tank (20) having a first set of side walls (22a) and (22b) which extend from an end member (24) forming a vessel half and a second set of side walls (26a) and (26b) which extend from an end member (28) forming a second vessel half. The vessel halves are bonded together at joints (29a) and (29b) to form a sealed tank. As is well known in the art, the tank (20) may be provided with an ingress and egress opening for filling and emptying the tank. Each of the first and second sets of side walls (22a), (22b), (26a) and (26b) and the end member (24) of the first set and the end member (28) from the second set are composed of a double-walled laminate (30) shown in detail in FIG. 3.

Figure 3:
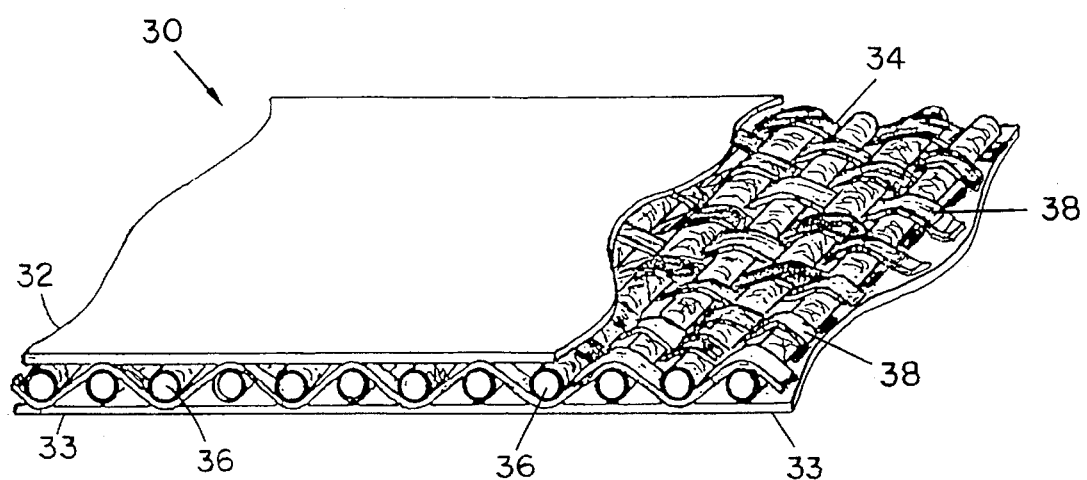
FIG. 3 is a perspective view of a portion of a side wall of a vessel of the present invention.

As may be seen in FIG. 3, a portion (30) of the side wall (12a) of the vessel of the present invention comprises a first inner wall (32) spaced apart from a second outer wall (33) with an intermediate single woven member (34) disposed between the spaced apart first and second walls. The intermediate single woven member (34) comprises a plurality of longitudinally extending cylindrical members (36) positioned generally parallel to each other and a plurality of generally parallel fibers (38) woven about the cylindrical members (36) and extending generally perpendicularly to the cylindrical members (36). The single woven layer (34) is bonded between the first inner wall (32) and the second outer wall (33) with resinous material. It should be understood that the other side wall (12b) and end section (14) of the vessel are of similar construction as side wall (12a).

The first inner (32) and second outer (33) walls are each constructed of resinous material which may be plastic resins and/or reinforced plastic resins. The reinforcement in the plastic resins is preferably fiberglass. The first inner (32) and second outer (33) walls are made up of numerous layers of fiberglass reinforced resins. Plastic resins, such as, polyester resins or vinylester resins can be used to make the wall layers. Phthalic polyester resins, such as isophthalic or orthophthalic resins, are preferred. Orthophthalic polyester resins are cheaper than isophthalic resins and may be used where cost is a factor in selecting the materials. Vinyl polyester resins or other premium grade resins may be used where a high chemical resistance of the material is required. Knitted fiberglass impregnated with isophthalic resin, such as DBM 1708 manufactured by KNYTEX of Seguin, Texas is an example of a preferred reinforced resin system; however, certain applications may require different resin systems. The fiberglass reinforcement can be prepared by chopping the fiberglass or by applying it in the form as a thin fabric-like material off of a roll or by using any other preparation which is known and used in the laminate industry.

The intermediate single woven member (34) present between the first inner (32) and second outer (33) walls is composed of two components, cylindrical members (36) and generally parallel fibers (38) woven about the cylindrical members. The cylindrical members (36) are known in the weaving trade as the weft, which is defined as a filling thread. The generally parallel fibers (38) woven about the cylindrical members are known in the weaving trade as the warp, which is defined as a series of yarns extending lengthwise and crossed by the weft.

The cylindrical members (36) or weft may be made of different types of material depending upon the type of vessel which is to be constructed. If the vessel is to be used in the marine industry, then the cylindrical members (36) may be made of a polyurethane foam or polyethylene foam piping, such as ETHAFOAM (a trademark of Dow Chemical Company) with an outside diameter of 3/16 inch (see FIG. 4a). These cylindrical members should be spaced so that there are approximately four members to one inch for use in a marine vessel, such as a boat hull or boat bulkhead. Whereas, if the vessel is to be used in the container industry, then the cylindrical members (36) may be made of a flexible polyvinyl tubing with an outside diameter of 3/16 inch and an inside diameter of 1/16 inch (See FIG. 4b). These cylindrical members should be spaced so that there are approximately three members to one inch for use in a container vessel, such as a tank.

The generally parallel fibers (38) woven about the cylindrical members are preferably flat strands of fiberglass known as roving. For use in a marine vessel, the parallel fibers are preferably 675 yards per pound fiberglass roving such as PPG HYBON, a trademark of Pittsburgh Plate Glass Company, Pittsburgh, Pa. For use in a container vessel, the parallel fibers are preferably 450 yards per pound fiberglass roving such as PPG HYBON, also a trademark of Pittsburgh Plate Glass Company.

The intermediate single woven layer (34) is produced on a standard single rapier loom. The weave pattern may be any industry recognized weave, such as basket weave, two by two twill weave or plain weave; the latter weave being the preferred weave in the woven layer (34) of the present invention. The selection of the weave is dependent upon the intended purpose of the end product.

The rapier loom head must be modified to accept large cylindrical members (36). Such a modification involves grinding a new cam profile and machining the jaws of the loom to accept the large cylindrical members (36). A filling feeding device is required to be used with the loom to keep the cylindrical members (36) moving in a controlled smooth manner as the loom cycles.

The fiberglass parallel fibers (38) or warp or roving woven about the cylindrical members (36), is supplied in centerpull packages and is placed behind the loom in shelf-type creels. Fiberglass roving is available in sizes or yields of 113, 250, 330, 450, 675, 900, 1200 and 1800 yards per pound. The roving passes out of a creel through a hole and into a reed behind the loom. The reed determines the spacing or gage of the roving. The combination of the reed dents per inch and the roving size determines the weight of the parallel fibers (38). For marine vessels, a 15 dent per square inch reed and a 675 yield roving produces an intermediate single woven layer (34) weighing 12.8 ounces per square yard. For container vessels, a 10 dent per square inch reed and a 450 yield roving produces an intermediate single woven layer (14) weighing 12 ounces per square yard. In some specialized vessels, different combinations of yields of roving and reed sizes could be utilized to obtain a woven layer which has particular specifications. Additionally the fiberglass could be replaced by other materials, such as graphite or an aramid fiber such as KEVLAR, a trademark of the DuPont Company.

The cylindrical members (36) and the parallel fibers (38) are fed into the loom, which is run using standard practice in the weaving industry; and the intermediate single woven member (34) is manufactured to the particular specifications required to construct a particular vessel. The selection of the materials and the tightness of the weave of the intermediate single woven member (34) are determining factors in obtaining a woven member (34) to meet particular requirements of the vessel it is to be utilized in. The intermediate single woven member (34) is now ready to be bonded to the first inner (32) and second outer (33) walls.

All of the methods generally used for making the different vessels employ a mold lay up process. The methods for making the various vessels require spraying or laying down separate layers of resinous materials which bond to each other as they cure. An exothermic chemical reaction occurs when the different layers of resin are applied to the mold. Each applied layer must be at approximately room temperature for it to be cured and ready for the application of the next layer.

Figure 1B:
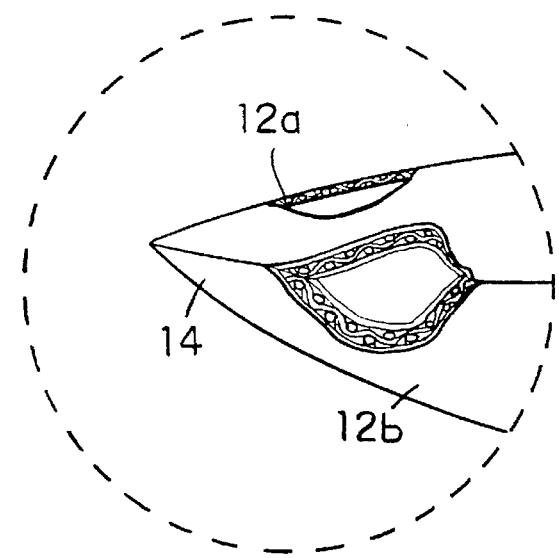
FIG. 1*b* is a cross-sectional view of a double-walled vessel of the present invention in the form of a boat hull.
Figure 4A:
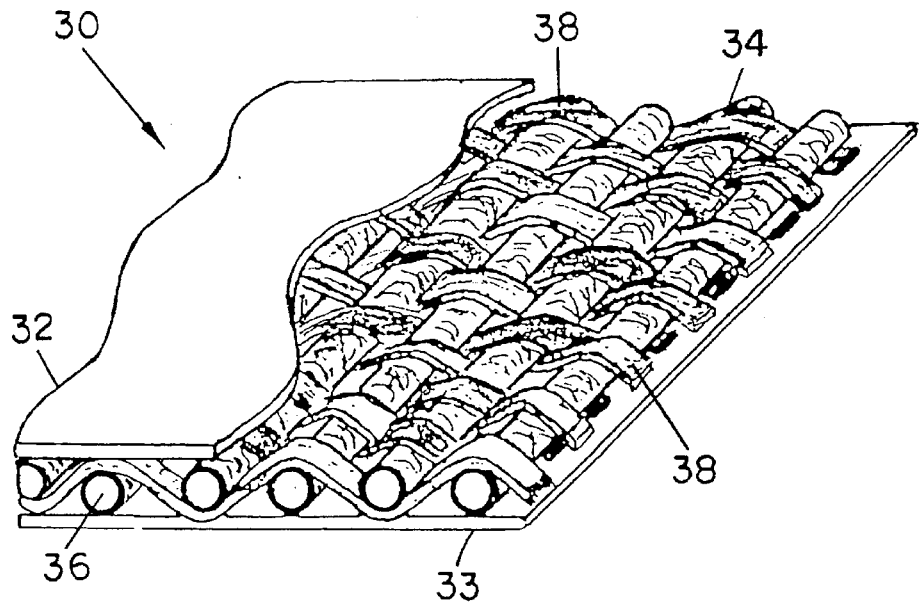
FIG. 4*a* is a side view of a portion of the intermediate single woven layer of the vessel of the present invention used in the marine industry.
Figure 5A:
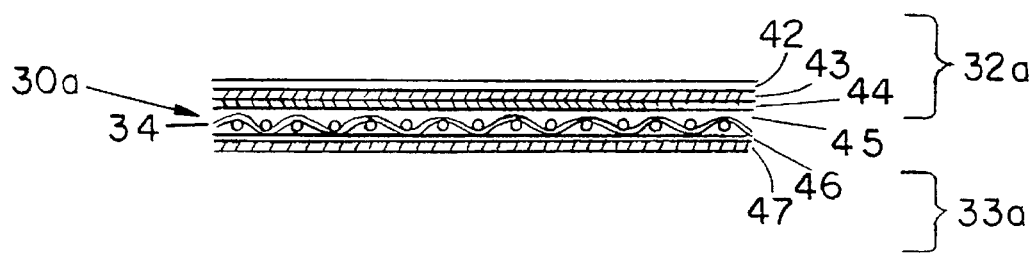
FIG. 5*a* is a cross-sectional view of a portion of the different layers of a side wall of a vessel suitable for use in the marine industry.

FIG. 5a discloses a detailed cross-sectional view of a section (30a) of the different layers of a double-walled laminate of which the side walls (12a) and (12b) and end member (14) of a marine vessel, as shown in FIGS. 1a and 1b, may be made. The following method is used to make the double-walled laminate. First a specific female mold having the desired shape of the vessel to be made is prepared by treating the mold with a mold releasing compound, such as wax, polyvinyl alcohol or any other compound known in the industry. A gel coat (42), optionally containing a color, is laid down in the mold and cured. The gel coat layer (42) will become the external surface of the vessel (10). After the gel coat layer (42) has cured, a fiberglass reinforced resin skin coat (43) is sprayed up onto the gel coat layer (42) and allowed to cure. After curing the fiberglass reinforced resin skin coat (43), an external structural reinforcement layer (44) is made by then applying rolls of fiberglass which are wet with liquid polyester resin. Layers (42), (43), and (44) together form the first inner wall (32a) of one of the sets of side walls (12a) or (12b) of the vessel (10). After layer (44) is cured, a bed coat of fiberglass resin (45) is sprayed onto layer (44). While the bed coat (45) is still wet, the intermediate single woven member (34) made to the specifications for a marine vessel shown in FIG. 4a, is laid onto it and rolled into the bed coat (45) with a handheld roller until the intermediate single woven member (34) is embedded in the bed coat (45). Then the embedded intermediate single woven member (34) is wetted with a liquid resin, such as a polyester or a vinylester resin, sufficient to wet both sides of the woven member (34). A thin fiberglass reinforced resin cap layer (46) is sprayed up on the wet intermediate single woven member (34) and rolled out with a handheld roller and allowed to cure. Then an internal structural reinforcement layer (47) is made by applying rolls of fiberglass which are wet with liquid resin. After the internal structural reinforcement layer (47) is allowed to cure, the vessel construction is continued while the constructed boat hull is still in the mold utilizing steps known to persons skilled in the boat construction art, such as laying stringers and bulkheads into the molded boat hull.

A vessel constructed according to this method contains an intermediate single woven member (34) in which the cylindrical members (36) are surrounded by solid resin and fiberglass reinforced resin. The strength of the side walls of the vessel (10) may be increased or decreased depending upon how closely the cylindrical members (36) are placed together and how much resin is sprayed onto the intermediate woven member (34). Placing the cylindrical members (36) closer together provides additional impact resistance of the vessel as a result of the increased compression strength of the double walled laminate.

Two related lay up methods for making a half of a double-walled vessel, such as a tank, may be used; one method using a female mold and one method using a male mold. The preferred specifications of an intermediate single woven member (34) for use in making the double wall of a tank has been disclosed above. This single woven member (34) is used in both of the processes described below. Each process makes a set of side walls extending from an end member.

Figure 4B:
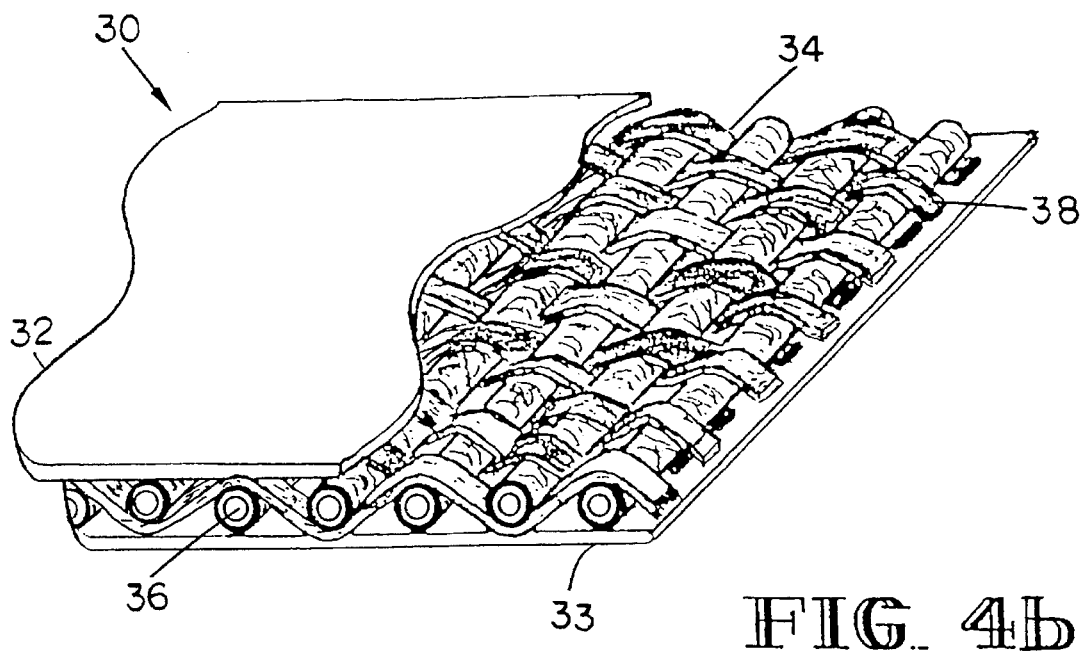
FIG. 4*b* is a side view of a portion of an alternative embodiment of the intermediate single woven layer of the vessel of the present invention used in the container industry.
Figure 5B:
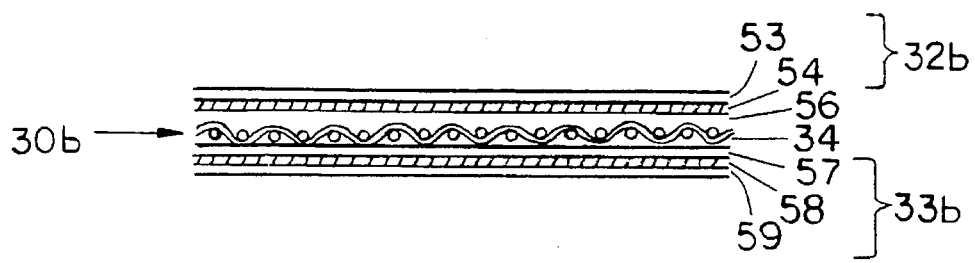
FIG. 5*b* is a cross-sectional view of a portion of the different layers of a side wall of a vessel suitable for use in the container industry.

FIG. 5b discloses a detailed cross-sectional view of a section (30b) of the different layers of a female molded double-walled laminate of which the side walls and the end member of a tank (20), as shown in FIG. 2, may be made. The first step involves coating the surface of the mold with wax, polyvinyl alcohol or other known coating compounds in the industry. A resin coat (53) is sprayed up onto the mold and allowed to cure. Then an external structural fiberglass reinforced resin layer (54) is sprayed up on the mold to the desired thickness, rolled out with a handheld roller and allowed to cure. The thickness of these layers may be increased to meet any additional requirements of the user. Then a bed coat (56) of fiberglass resin is sprayed onto the reinforced resin layer (54) and rolled out with a handheld roller. The intermediate single woven member (34) made to the specifications for use in a double-walled tank as shown in FIG. 4b, is laid into the wet bed coat (56) and is rolled in the bed coat with a roller. Then the embedded intermediate single woven member (34) is lightly wetted with liquid resin. A thin fiberglass reinforced resin cap layer (57) is sprayed on the wet woven member (34) and allowed to cure. Following curing, an internal structural fiberglass reinforced resin (58) is sprayed up on the mold to the required thickness, rolled out with a handheld roller and allowed to cure. Then an internal coat (59) of liquid resin is applied to layer (58) as a corrosion barrier and the molded portion of the tank is removed from the mold.

Figure 5C:
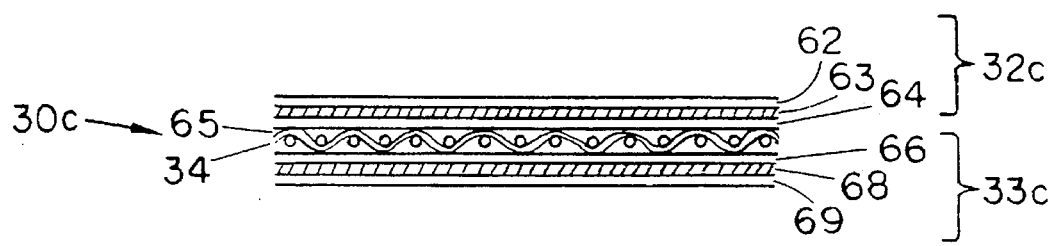
FIG. 5*c* is a cross-sectional view of a portion of the different layers of an alternative embodiment of a side wall of a vessel suitable for use in the container industry.

FIG. 5c discloses a detailed cross-sectional view of a section (30c) of an alternative embodiment of different layers of a male molded double-walled laminate of which the side walls and the end member of a tank (20), as shown in FIG. 2. The first step of the method involves coating the surface of the mold with wax, polyvinyl alcohol or other known coating compounds in the industry. This step is followed by applying a veil lining of spun bonded polyester, glass or equivalent material which has the appearance of thin gauze. Then the veil is coated to 90% by weight with resin, chop strand fiberglass and resin are applied and rolled with a hand-held roller to form a coating layer (62) as a barrier to corrosion, as this layer forms the interior of the tank. Industry standards require that this corrosion barrier layer be a minimum thickness; and at the present time that thickness is 0.01 inches. Next the internal structural fiberglass reinforced resin layer (63) is sprayed up on the mold to the required thickness, rolled out with a handheld roller and allowed to cure. Onto this layer (63), a fiberglass reinforced resin layer (64) is sprayed and allowed to cure. Then a bed coat (65) of fiberglass resin is sprayed onto the resin layer (64) and rolled out with a handheld roller. The intermediate single woven member (34) made to the specifications for use in a double-walled tank as shown in FIG. 4b, is laid into the wet bed coat (65) and is rolled into the bed coat with a roller. Then the embedded intermediate single woven member (34) is lightly wetted with liquid resin. A thin fiberglass reinforced resin cap layer (66) is sprayed on the wet woven member (34) and allowed to cure. Following curing, an external structural fiberglass reinforced resin layer (68) is sprayed up on the cured cap layer (66) to the required thickness, rolled out with a handheld roller and allowed to cure. Then this external structural layer (68) is coated with a liquid resin forming external coat (69) of the tank and the molded portion of the container is removed from the mold.

After each of the halves of the tank is made using one of the molding processes, the two halves are fit together at joints (29a) and (29b) (as seen in FIG. 2) at the first and second sets of side walls and bonded with resin using techniques and materials known in the industry. One of the halves may additionally contain an opening to allow egress and ingress of a fluid into the tank and other openings necessary to monitor the tank.

The thicknesses of the interior and exterior walls of the double-walled tank, which are comprised of the first inner (32) and second outer (33) walls, are each composed of a number of layers of fiberglass reinforced resin and the total thickness can vary depending upon the intended use of the vessel.

Figure 6A:
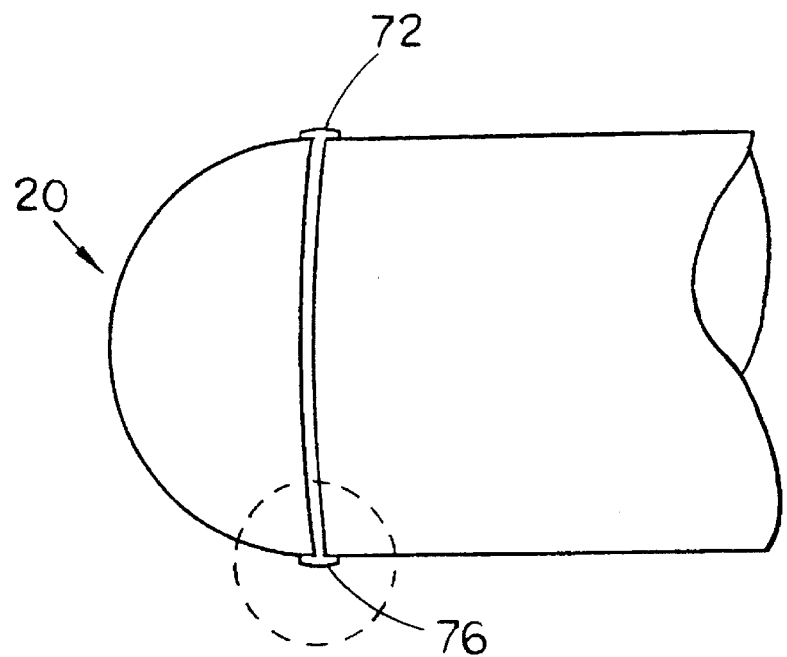
FIG. 6*a* is a perspective view of a section of a vessel of the present invention formed into a tank containing a leak detection monitor.
Figure 6B:
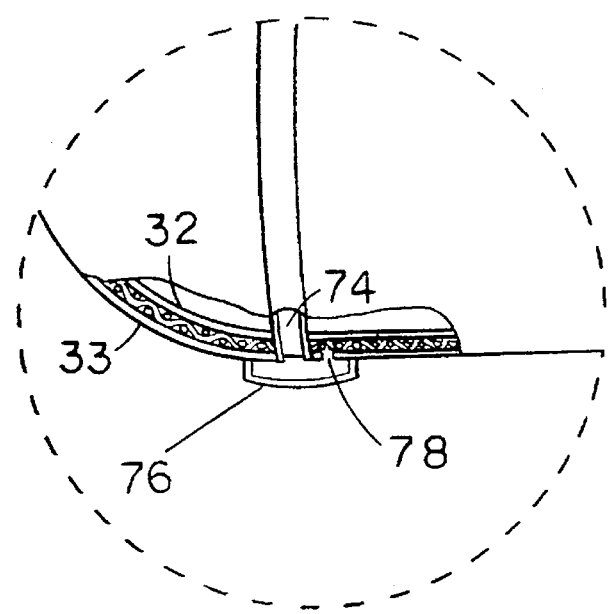
FIG. 6*b* is an enlarged view of the leak detection monitor of the vessel of FIG. 6*a*.

Leak detection monitors for containers holding toxic liquids are known in the field. FIGS. 6a and 6b show that this type of monitor can be used on the double-walled tank (20) of the present invention. The monitor (72) is located on the top of the tank as oriented when it is placed in the ground and an access cavity runs around the lateral perimeter of the tank. The access cavity (74) is connected to a sump area (76) which is located on the bottom of the tank as oriented when it is placed in the ground. The exterior wall of the tank has an opening or weep hole (78) which would allow any liquid which has leaked through the interior wall (32) of the container (20) to accumulate in the sump (76) and be detected by the monitor (72) via the access cavity (74).

While the foregoing discussion of the present invention has described the moldable three layer laminate in relation to certain preferred embodiments, and specific details have been disclosed for the purpose of illustration, it will be apparent to those skilled in the art that the invention is intended to cover alternatives, modifications, and equivalents that are encompassed within the spirit and scope of the invention without departing from the basic principles of the invention.

I claim:

1. A vessel comprising:
  a first set of side walls extending from an integral end member, said side walls and said end member having
    a first inner wall spaced apart from a second outer wall, said walls constructed of resinous material; and
    a first intermediate single woven member disposed between said spaced apart first and second walls, said first intermediate single woven member, further comprising:
      a first plurality of longitudinally extending cylindrical members positioned generally parallel to each other and a first plurality of generally parallel fibers woven about said cylindrical members and extending generally perpendicularly to said cylindrical members,
    said first intermediate member further bonded between said first and second walls with resinous material.

2. The vessel of claim 1, wherein said resinous material for constructing said first and second walls and for bonding said first intermediate member between said first and second walls is fiberglass impregnated with a polyester resin.

3. The vessel of claim 1, wherein said cylindrical members are hollow, plastic tubes.

4. The vessel of claim 1, wherein said cylindrical members are solid, foam pipes.

5. The vessel of claim 1, wherein said parallel fibers are fiberglass roving.

6. The vessel of claim 1, wherein said vessel is a boat hull.

7. The vessel of claim 1, further comprising a second set of side walls extending from a second integral end member having
  a first inner wall of said second set spaced apart from a second outer wall of said second set, said walls constructed of resinous material; and
  a second intermediate single woven member disposed between said spaced apart first and second walls of said second set, said second intermediate single woven member, further comprising:
    a second plurality of longitudinally extending cylindrical members positioned generally parallel to each other and a second plurality of generally parallel fibers woven about said cylindrical members and extending generally perpendicularly to said cylindrical members,
  said second intermediate member further bonded between said first and second walls of said second set with resinous material; and
said first set and said second set of side walls sealingly bonded together to form a tank, further comprising an opening in said tank to allow egress and ingress of a fluid.

8. A method of making a vessel having a first set of side walls extending from an integral end member on a mold comprising:
  sequentially applying and curing a first set of layers of resinous material to said mold;
  applying an intermediate single woven member to said first set of layers of resinous material, said intermediate single woven member, further comprising:
    a plurality of longitudinally extending cylindrical members positioned generally parallel to each other and a plurality of generally parallel fibers woven about said cylindrical members and extending generally perpendicularly to said cylindrical members;
  sequentially applying and curing a second set of layers of resinous material to said intermediate single woven member; and
  removing said double-walled vessel from said mold.

* * * * *